(12) United States Patent
Friehauf (10) Patent No.: US 10,808,521 B2
(45) Date of Patent: Oct. 20, 2020

(54) HYDRAULIC FRACTURE ANALYSIS

(71) Applicant: ConocoPhillips Company, Houston, TX (US)

(72) Inventor: Kyle Friehauf, Houston, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 233 days.

(21) Appl. No.: 15/715,146

(22) Filed: Sep. 25, 2017

(65) Prior Publication Data
US 2018/0016890 A1 Jan. 18, 2018

Related U.S. Application Data

(63) Continuation-in-part of application No. 14/263,271, filed on Apr. 28, 2014, now abandoned.

(60) Provisional application No. 61/829,374, filed on May 31, 2013.

(51) Int. Cl.
*E21B 43/26* (2006.01)
*E21B 47/07* (2012.01)
*E21B 47/12* (2012.01)

(52) U.S. Cl.
CPC .............. *E21B 47/07* (2020.05); *E21B 43/26* (2013.01); *E21B 47/123* (2013.01); *G01V 2210/646* (2013.01); *G01V 2210/66* (2013.01)

(58) Field of Classification Search
CPC ... E21B 47/065; E21B 43/26; G01V 2210/66; G01V 2210/646
See application file for complete search history.

(56) References Cited

U.S. PATENT DOCUMENTS

| | | |
|---|---|---|
| 3,981,187 A | 9/1976 | Howell |
| 4,676,664 A | 6/1987 | Anderson et al. |
| 6,026,913 A | 2/2000 | Mandal et al. |
| 6,176,323 B1 | 1/2001 | Weirich et al. |
| 6,268,911 B1 | 7/2001 | Tubel et al. |

(Continued)

FOREIGN PATENT DOCUMENTS

| | | |
|---|---|---|
| GB | 2492802 | 1/2013 |
| WO | 2001048353 | 7/2001 |

(Continued)

OTHER PUBLICATIONS

Ribeiro et al., Detecting Fracture Growth Out of Zone Using Temperature Analysis, Oct. 27-29, 2014, SPE-170746-MS, SPE Annual Technical Conference and Exhibition, Amsterdam, The Netherlands, 24 pp. (Year: 2014).*

(Continued)

*Primary Examiner* — Toan M Le
(74) *Attorney, Agent, or Firm* — Boulware & Valoir (57) ABSTRACT

This disclosure describes a method of assessing fractures in an underground formation using temperature profile measured by a DTS. The fractures can be identified by a temperature profile established by the feedback signals obtained from the DTS, but the DTS measurements are made at least 36 hours after a stage is fractured and during shut-in, thus allow crossflow and other noise sources to abate. Further, the size of the temperature differential is indicative of fracture spacing or density, not volume of fluid flow as thought in the prior art. Thus, these methods can be used to optimize the next stage or next well in a fracturing program.

20 Claims, 9 Drawing Sheets

(56) References Cited

U.S. PATENT DOCUMENTS

| | | | |
|---|---|---|---|
| 6,778,720 | B1 | 8/2004 | Cekorich et al. |
| 7,055,604 | B2 | 6/2006 | Jee et al. |
| 7,668,411 | B2 | 2/2010 | Davies et al. |
| 8,505,625 | B2 | 8/2013 | Ravi et al. |
| 8,630,816 | B2 | 1/2014 | Park et al. |
| 8,646,968 | B2 | 2/2014 | MacDougall et al. |
| 8,930,143 | B2 | 1/2015 | Sierra et al. |
| 8,950,482 | B2 | 2/2015 | Hill et al. |
| 9,116,119 | B2 | 8/2015 | Le Floch |
| 9,273,548 | B2 | 3/2016 | LeBlanc et al. |
| 9,347,310 | B2 | 5/2016 | Unalmis et al. |
| 9,416,644 | B2 | 8/2016 | McEwen-King et al. |
| 9,464,512 | B2 | 10/2016 | Kalia et al. |
| 10,095,828 | B2 | 10/2018 | Swan et al. |
| 2002/0180728 | A1 | 12/2002 | Neff et al. |
| 2003/0205375 | A1 | 11/2003 | Wright et al. |
| 2006/0272809 | A1 | 12/2006 | Tubel et al. |
| 2008/0277568 | A1 | 11/2008 | Crickmore et al. |
| 2009/0114386 | A1 | 5/2009 | Hartog et al. |
| 2009/0194333 | A1 | 8/2009 | MacDonald |
| 2009/0326826 | A1 | 12/2009 | Hull et al. |
| 2010/0076738 | A1 | 3/2010 | Dean |
| 2010/0200743 | A1 | 8/2010 | Forster et al. |
| 2010/0200744 | A1 | 8/2010 | Pearce et al. |
| 2010/0284250 | A1 | 11/2010 | Cornish et al. |
| 2011/0019178 | A1 | 1/2011 | Vlatas |
| 2011/0188347 | A1 | 8/2011 | Thiercelin et al. |
| 2011/0288843 | A1 | 11/2011 | Weng |
| 2012/0017687 | A1 | 1/2012 | Davis et al. |
| 2012/0057432 | A1 | 3/2012 | Hill et al. |
| 2012/0067118 | A1 | 3/2012 | Hartog et al. |
| 2012/0092960 | A1 | 4/2012 | Gaston et al. |
| 2012/0133367 | A1 | 5/2012 | Bittar et al. |
| 2012/0147924 | A1 | 6/2012 | Hall |
| 2013/0023353 | A1 | 1/2013 | Wright |
| 2013/0032338 | A1 | 2/2013 | Kalia |
| 2013/0211726 | A1 | 8/2013 | Mestayer et al. |
| 2013/0233537 | A1 | 9/2013 | McEwen-King et al. |
| 2013/0298635 | A1 | 11/2013 | Godfrey |
| 2013/0298665 | A1 | 11/2013 | Minchau |
| 2014/0036628 | A1 | 2/2014 | Hill et al. |
| 2014/0100274 | A1 | 4/2014 | Bobotas et al. |
| 2014/0110124 | A1 | 4/2014 | Goldner et al. |
| 2014/0126325 | A1 | 5/2014 | Farhadiroushan et al. |
| 2014/0163889 | A1 | 6/2014 | Finfer et al. |
| 2014/0180592 | A1 | 6/2014 | Ravi et al. |
| 2014/0202240 | A1 | 7/2014 | Skinner et al. |
| 2014/0216151 | A1 | 8/2014 | Godfrey |
| 2014/0246191 | A1 | 9/2014 | Zolezzi-Garreton |
| 2014/0260588 | A1 | 9/2014 | Jaaskelainen et al. |
| 2014/0290936 | A1 | 10/2014 | Wills et al. |
| 2014/0358444 | A1 | 12/2014 | Friehauf et al. |
| 2014/0365130 | A1 | 12/2014 | Woods |
| 2015/0000932 | A1 | 1/2015 | O'Brien |
| 2015/0014521 | A1 | 1/2015 | Barfoot |
| 2015/0057934 | A1 | 2/2015 | Ma et al. |
| 2015/0083405 | A1 | 3/2015 | Dobroskok et al. |
| 2015/0135819 | A1 | 5/2015 | Petrella et al. |
| 2015/0146759 | A1 | 5/2015 | Johnston |
| 2015/0159478 | A1 | 6/2015 | Georgi et al. |
| 2015/0331971 | A1 | 11/2015 | Scollard et al. |
| 2016/0003032 | A1 | 1/2016 | Grubb et al. |
| 2016/0138389 | A1 | 5/2016 | Stokely |
| 2016/0146962 | A1 | 5/2016 | Hayward |
| 2016/0265345 | A1 | 9/2016 | In't Panhuis et al. |
| 2016/0266276 | A1 | 9/2016 | Stokely et al. |
| 2016/0356125 | A1 | 12/2016 | Bello et al. |
| 2017/0045410 | A1 | 2/2017 | Crickmore et al. |
| 2017/0075005 | A1 | 3/2017 | Ranjan et al. |
| 2017/0075006 | A1 | 3/2017 | Dusterhoft et al. |
| 2017/0191363 | A1 | 7/2017 | Dickenson |
| 2017/0205260 | A1 | 7/2017 | Jaaskelainen |
| 2017/0260839 | A1 | 9/2017 | Beardmore et al. |
| 2017/0260842 | A1 | 9/2017 | Jin et al. |
| 2017/0260846 | A1 | 9/2017 | Jin et al. |
| 2017/0260849 | A1 | 9/2017 | Jin et al. |
| 2017/0260854 | A1 | 9/2017 | Jin et al. |
| 2017/0328181 | A1 | 11/2017 | Kristjansson et al. |
| 2017/0342814 | A1 | 11/2017 | Krueger et al. |
| 2018/0016890 | A1 | 1/2018 | Friehauf |
| 2018/0217285 | A1 | 8/2018 | Walters et al. |
| 2018/0230049 | A1 | 8/2018 | Wysocki et al. |
| 2018/0348389 | A1 | 12/2018 | Jaaskelainen et al. |

FOREIGN PATENT DOCUMENTS

| | | |
|---|---|---|
| WO | 2013092906 | 6/2013 |
| WO | 2014201316 | 12/2014 |
| WO | 2015065869 | 5/2015 |
| WO | 2015076976 | 5/2015 |
| WO | 2015094180 | 6/2015 |
| WO | 2015107332 | 7/2015 |
| WO | 2015170113 | 11/2015 |
| WO | 2015187140 | 12/2015 |
| WO | 2015187149 | 12/2015 |
| WO | 2016007161 | 1/2016 |
| WO | 2016069322 | 5/2016 |
| WO | 2017027340 | 2/2017 |
| WO | 2017039605 | 3/2017 |
| WO | 2017156339 | 9/2017 |
| WO | 2018204920 | 11/2018 |

OTHER PUBLICATIONS

URTEC-2670034-MS (2017) Raterman K.Y., et al., Sampling a Stimulated Rock Volume: An Eagle Ford Example.

SPS-168610-MS (2014)—Holley, E.H., et al. "Using Distributed Optical Sensing to Constrain Fracture Models and Confirm Reservoir Coverage in Permian Basin." SPE Hydraulic Fracturing Technology Conference, The Woodlands, Texas, U.S.A., Feb. 4-6.

SPE-153131-PA (2013)—Holley, E.H., et al., "Interpreting Uncemented Multistage Hydraulic-Fracturing Completion Effectiveness by Use of Fiber-Optic DTS Injection Data." SPE Drilling & Completion, 28(3): 243-253.

SPE-107775-PA (2009)—Glasbergen G., et al., "Real-Time Fluid Distribution Determination in Matrix Treatments Using DTS", Society of Petroleum Engineers.

SPE-116182-MS (2008)—Sierra J.R., et al., "DTS Monitoring of Hydraulic Fracturing: Experiences and Lessons Learned", Society of Petroleum Engineers.

SPE-107854-MS (2007)—Tardy, et al., "An Experimentally Validated Wormhole Model for Self-Diverting and Conventional Acids in Carbonate Rocks Under Radial Flow Conditions", Society of Petroleum Engineers.

Awada, k, et al., "Is that interference? A work flow for identifying and analyzing communication through hydraulic fractures in a multiwell pad," SPE Journal, vol. 21, No. 5, pp. 13 (Oct. 2016).

Becker, M.B., et al., "Measuring Hydralic Connection in Fractured Bedrock with Periodic Hydraulic Tests and Distributed Acoustic Sensing," Juounal of Hydrology, pp. 1-11 (Feb. 22-24, 2016).

Boman, K, "DAS technology expands fiber optic applications for oil, gas industry," Rigzone, (May 4, 2015) issue : http://www.rigzone.com/news/oil_gas/a/138405/DAS_Technology_Expands_Fiber_Optic_Applications_for_Oil_Gasindustry, pp. 4.

Booone, K., et al., "Monitoring Hydraulic Fracturing Operations Using Fiber-Optic Distributed Acoustic Sensing," Unconventional Resources Technology Conference, pp. 8 (2015).

European Search Report for European Application No. EP 17764137.0 dated Mar. 6, 2019.

European Search Report for European Application No. EP 17764143.8 dated Mar. 4, 2019.

European Search Report for European Application No. EP 177641503 dated Mar. 4, 2019.

European Search Report for European Application No. EP 17764151.1 dated Mar. 4, 2019.

European Search Report for European Application No. EP17764146.1 dated Mar. 14, 2019.

(56) References Cited

OTHER PUBLICATIONS

Grayson, S., et al., "Monitoring acid stimulation treatments in naturally fractured reservoirs with slickline distributed temperature sensing," Society of Petroleum Engineers, pp. 17, (Jan. 2015).
International Search Report with Written Opinion for International Application No. PCT/US2017/021659 dated Jun. 1, 2017, pp. 7.
International Search Report with written opinion dated Jun. 1, 2017 for International Application No. PCT/US2017/021667, pp. 8.
International Search Report with Written Opinion for International Application No. PCT/US2017/021674 dated May 25, 2017, pp. 10.
International Search Report with Written Opinion for International Application No. PCT/US2017/021678 dated Jun. 1, 2017, pp. 7.
International Search Report with Written Opinion for International Application No. PCT/US2017/021679 dated May 25, 2017, pp. 7.
International Search Report with Written Opinion for International Application No. PCT/US2017/021681 dated May 22, 2017, pp. 10.
International Search Report with Written Opinion for International Application No. PCT/US2017/21670 dated May 25, 2017, pp. 6.
International Search Report with Written Opinion for International Application No. PCT/US2018/031404 dated Jul. 13, 2018, pp. 15.
International Search Report with Written Opinion for International Application No. PCT/US2018/056327 dated Dec. 21, 2018, pp. 12.
International Search Report with Written Opinion for International Application No. PCT/US2019/030408 dated Jul. 22, 2019, pp. 9.
Jin, G., and Roy, B., "Hydraulic-fracture geometry characterization using low-frequency DAS signal," The Leading Edge, pp. 975-980 (Dec. 2017).
Johannessen, K., et al. "Distributed Acoustic Sensing—a new way of listening to your well/reservoir," Society of Petroleum Engineers, Society of Petroleum Engineers, pp. 1-9 (Mar. 27-29, 2012).
Le Calvez, J. H., et al. "Real-time microseismic monitoring of hydraulic fracture treatment: a tool to improve ,mmpletion and reservoir management," Society of Petroleum Engineers, pp. 7 (Jan. 2007).
Lord, D.L, "Study of Performation Friction Pressure Employing a Loarge-Scale Fracturing Flow Simulator," SPE Annual technical Conference and Exhibition, pp. 10 (Sep. 25, 1994).
Mckinley, R.M., et al., "Specialized Applications of Noise Logging," Journal of Petroleum Technology, vol. 31, Issue 11, pp. 1387-1395 (Nov. 1979).
Mckinley, R.M., et al., "The Structure and Interpretation of Noise From Flow Behind Cemented Casing," Journal of Petroleum Technology, vol. 25, No. 3, pp. 329-338 (Mar. 1973).
Molenaar, M., et al, "First Downhole Application of Distributed Acoustic Sensing (DAS) for Hydraulic Fracturing Monitoring and Diagnostics," Society of Petroleum Engineers, vol. 27, No. 1, pp. 32-38 (Mar. 2012).
Molenaar, M.M., et al., "Real-Time Downhole Monitoring of Hydraulic Fracturing Treatments Using Fibre Optic Distributed Temperature and Acoustic Sensing," Society of Petroleum Engineers, pp. 13 (2012).
European Search Report for European Application No. EP18794756.9 dated Apr. 14, 2020.
Bukhamsin, A., et al., Cointerpretation of distributed acoustic and temperature sensing for improved smart well inflowproefiling. In SPE 180465-MS, Western Regional Meeting. Society of Petroleum Engineers (2016).
Byrd, R. H., et al., A limited memory algorithm for bound constrained optimization. Siam Journal on Scientific Computing, 16 (5), 1190-1208 (1995).
Curtis, M., et al. (1973). Use of the temperature log for determining flow rates in producing wells. In Fall Meeting of theSociety of Petroleum Engineers of AIME. Society of Petroleum Engineers 4637 (1973).
Dakin' J., Distributed optical fibre Raman temperature sensor using a semiconductor light source and detector. Electronics letters, 21 (13), 569-570 (1985).
Ouyang, L.-B., Flow profiling by distributed temperature sensor (DTS) system-expectation and reality. SPE Production& Operations, 21 (02), 269---281 (2006).
Ramey Jr, H., et al., Wellbore heat transmission. Journal of Petroleum Technology, 14 (04), 427-435 (1962).
Van der Horst, et al., Fiber optic sensing for improved wellbore production surveillance. In IPTC 2014: InternationalPetroleum Technology Conference (2014).
Vu-Hoang, D., et al., A novel approach to production logging in multiphase horizontal wells. In SPE 89848, AnnualTechnical Conference and Exhibition. Society of Petroleum Engineers (2004 ).
Rector, J.W., et al—"The Use of an Active Drill Bit for Inverse Vsp Measurements", 2018, Exploration Geophysics, vol. 20, Issue 1-2, Abstract only, 5 pgs.
Hesthammer, J et al. "From seismic data to core data: an integrated approach to enhance reservoir characterization"; 2003; Geological Society, London, Special Publications, 209, pp. 39-54.
Optasense, "Pipeline Integrity Management: Leak Detection," accessed at https://ace-control.com.sg/wp-content/uploads/2018/11/Pipeline-Integrity-Management-Leak-Detection.pdf, accessed on Jun. 10, 2019, pp. 5.
Ouyang, L-B., et al. "Flow profiling via distributed temperature sensor (DTS) system-expectation and reality," Society of Petroleum Engineers, pp. 14 (2004).
Paleja, R, et al., "Velocity Tracking for Flow Monitoring and Production Profiling Using Distributed Acoustic Sensing," Society of Petroleum Engineers, pp. 16 (Sep. 28-30, 2015).
Portis, D. H., et al., "Searching for the optimal well spacing in the eagle ford shale: A practical tool-kit," Unconventional Resources Technology Conference, pp. 8 (Aug. 12-14, 2013).
Sellwood S.M., et al., "An in-well heat-tracer-test method for evaluating borehole flow conditions," Hydrogeology Journal, Springer, vol. 23, No. 8, pp. 1817-1830 (Aug. 29, 2015).
Webster, P., et al. "Micro-Seismic detection using distributed acoustic sensing," society of Exploration Geophysicists, pp. 5 (Aug. 19, 2013).
Webster, P., et al., "Developments in Diagnostic Tools for Hydraulic Fracture Geometry Analysis," Unconventional Resources Technology Conference, pp. 7 (Aug. 12-14, 2013).
Wheaton, B., et al. "A case study of completion effectiveness in the eagle ford shale using DAS/DTS observations and hydraulic fracture modeling," Society of Petroleum Engineers, pp. 11 (2016).
Wu, K, et al. "Mechanism analysis of well interference in unconventional reservoirs: Insights from fracture-geometry simulation between two horizontal wells," Society of Petroleum Engineers, vol. 33, No. 1, pp. 9 (Feb. 2018).

* cited by examiner

CONSEQUENCE: LOOK TO LATER TIME WARMBACK (MULTIPLE DAYS) FOR ANALYSIS.
THIS WILL GET PAST LOW RADIUS OF INVESTIGATION AND CROSSFLOW EFFECTS

HYDRAULIC FRACTURE ANALYSIS

PRIOR RELATED APPLICATIONS

This invention is a continuation-in-part of and claims priority to U.S. patent Ser. No. 14/263,271, filed on Apr. 28, 2014, which is a non-provisional application of US 61/829,374, filed on May 31, 2013, each of which is incorporated by reference in its entirety herein for all purposes.

FIELD OF THE INVENTION

This invention relates to a system and method for identifying the presence of fractures in a wellbore during and after treatment, and more specifically to a system and method for assessing one or both of fracture density and fracture position in a wellbore after hydraulic fracturing treatment.

BACKGROUND OF THE INVENTION

Hydraulic fracturing, matrix acidizing, and other types of stimulation treatments are routinely conducted in oil and gas wells to enhance hydrocarbon production. The wells being stimulated often include a large section of perforated casing or an open borehole having significant variation in rock petrophysical and mechanical properties. As a result, a treatment fluid pumped into the well may not flow equally to all desired hydrocarbon-bearing layers that need stimulation. To achieve effective stimulation, the treatments often involve the use of diverting agents in the treating fluid, such as chemical or particulate material, to help reduce the flow into the more permeable layers that no longer need stimulation and increase the flow into the lower permeability layers.

However, during a stimulation treatment, the flow distribution in a well can change quickly, due to either stimulation of the formation layers to increase their flow capacity or due to a temporary reduction in flow capacity as a result of diverting agents. To determine the effectiveness of stimulation or diversion in the well, an instantaneous measurement that gives a "snap shot" of the flow distribution in a well is thus desired. Unfortunately, there are few such techniques available to provide this information.

Precise distributed borehole temperature measurements are also important for completion and production monitoring. For example, different borehole temperature reflects different mud density, which is vital in flow rate calculations. Also, drilling fluids may expand or contract downhole, which also causes variations in the effective bottomhole pressure (BHP). This volumetric change gives the appearance of a gain or a loss in the mud puts. Further, changes in temperature after fracturing are used to assess fracture position. Therefore, accurate borehole temperature information can provide better production efficiency and estimation.

Many methods have been proposed to measure borehole temperatures. Placing a number of temperature sensors at different depths of a borehole is one way to accomplish the task, but it lacks continuous data long the borehole, especially when the wells are drilled several miles in different directions.

Distributed Thermal Sensing (DTS) is another way of measuring temperature in a continuous manner. DTS systems are optoelectronic devices that measure temperatures by means of optical fibers functioning as linear sensors. There are two basic principles of measurement for distributed sensing technology, OTDR (Optical Time Domain Reflectometry) and OFDR (Optical Frequency Domain Reflectometry). For Distributed Temperature Sensing often a Code Correlation technology is employed which carries elements from both principles.

OTDR was developed more than 20 years ago and has become the industry standard for telecom loss measurements, which detects the Rayleigh backscattering signals and are very dominant compared to Raman signals. The principle for OTDR is quite simple and is very similar to the time of flight measurement used for radar. Essentially a narrow laser pulse generated either by semiconductor or solid state lasers is sent into the fiber and the backscattered light is analyzed. From the time it takes the backscattered light to return to the detection unit it is possible to determine the location of the temperature event.

Alternative DTS evaluation units deploy the method of Optical Frequency Domain Reflectometry (OFDR). The OFDR system provides information on the local characteristic only when the backscatter signal detected during the entire measurement time is measured as a function of frequency in a complex fashion, and then subjected to Fourier transformation. The essential principles of OFDR technology are the quasi-continuous wave mode employed by the laser and the narrow-band detection of the optical backscatter signal. This is offset by the technically difficult measurement of the Raman scatter light and rather complex signal processing, due to the fast Fourier transform ("FFT") calculation with higher linearity requirements for the electronic components.

Code Correlation DTS sends on/off sequences of limited length into the fiber. The codes are chosen to have suitable properties, e.g., Binary Golay code. In contrast to OTDR technology, the optical energy is spread over a code rather than packed into a single pulse. Thus, a light source with lower peak power compared to OTDR technology can be used, e.g. long life compact semiconductor lasers. The detected backscatter needs to be transformed—similar to OFDR technology—back into a spatial profile, e.g. by cross-correlation. In contrast to OFDR technology, the emission is finite (for example 128 bit), which avoids weak scattered signals from far distances being superposed by strong scattered signals from short distances, thereby improving the shot noise and the signal-to-noise ratio.

One advantage of DTS technology is the ability to quickly acquire the temperature distribution along the well without having to move the sensor as in traditional well logging and which can be very time consuming. DTS technology effectively provides a "snap shot" of the temperature profile in the well.

DTS technology has been utilized to measure temperature changes in a wellbore immediately after a stimulation injection from which a flow distribution of an injected fluid has been qualitatively estimated. The inference of flow distribution (volume injected) is typically based on magnitude of temperature "warm-back" during a shut-in period after injecting a fluid into the wellbore and surrounding portions of the formation. The theory is that the injected fluid is typically colder than the formation temperature and a formation layer that receives a greater fluid flow rate during the injection has a longer "warm back" time compared to a layer or zone of the formation that receives relatively less flow of the fluid.

Temperatures are recorded by DTS along the optical sensor cable, thus not at discrete points, but as a continuous profile of temperature along the entire wellbore length. Temperature determination is therefore achieved over great distances. Typically the DTS systems can locate the temperature to a spatial resolution of 1 m with accuracy to within ±1° C. at a resolution of 0.01° C. Measurement distances of greater than 30 km can be monitored and some specialized systems can provide even tighter spatial resolutions.

Figure 1:
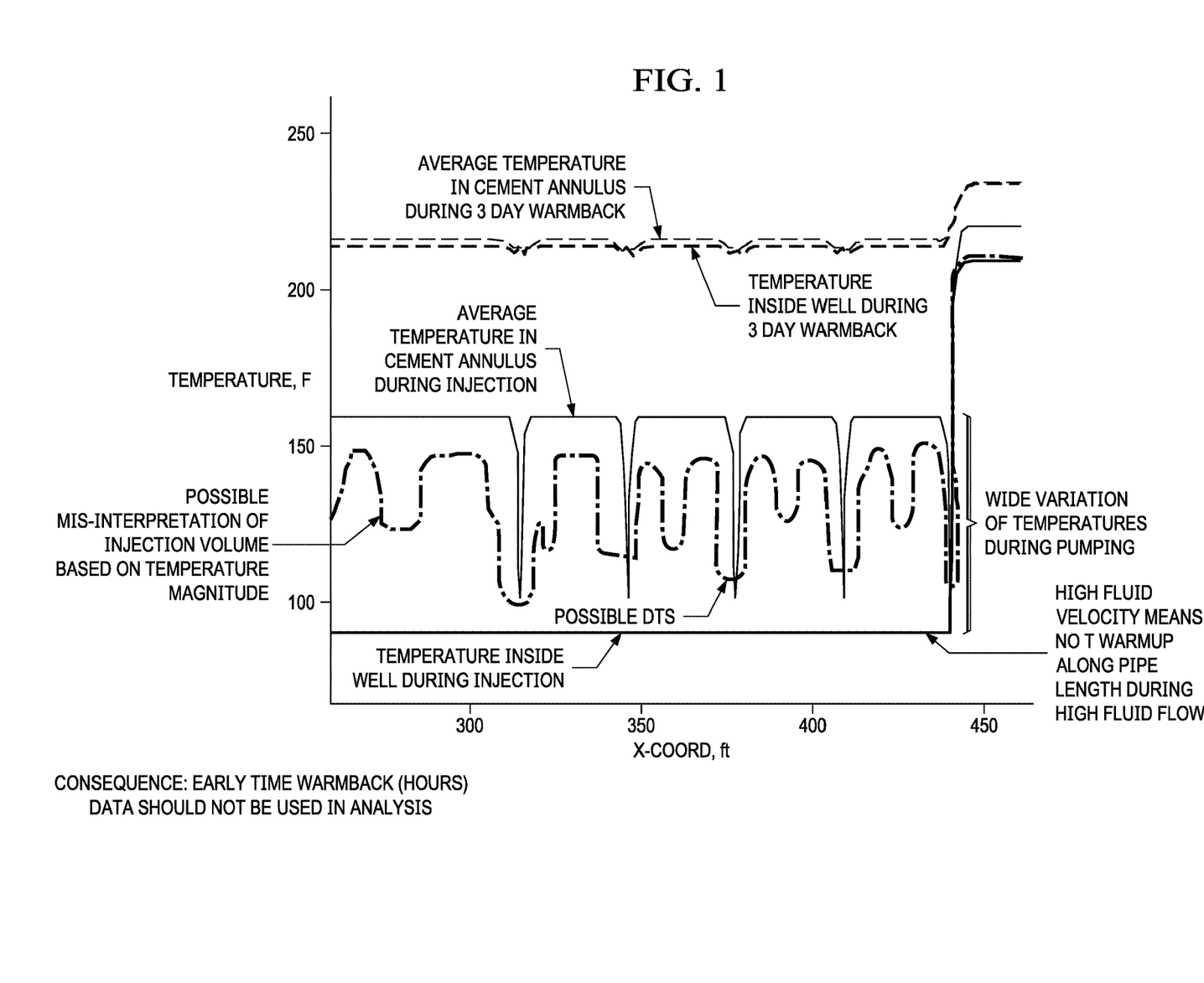
FIG. 1 shows a simulation of temperature data during fracking and very shortly (3 days) thereafter. The red lines are inside the well temperatures. The blue lines are T at a given distance, e.g., 1 inch away from the well in the cement annulus. The DTS sensor/fiber (green) is in-between those two points, allowing the measurement to have large variations along its length depending on the material and coupling between the well and its surroundings. Thus, the DTS measurements have a low radius of investigation because it is dependent on what is occurring very close to the well. DTS measurements taken at a later time mitigate this problem because a longer time allows a larger radii of investigation and the data is a measure of the fractures farther behind the casing (deeper into the reservoir).

However, using temperature measurements obtained by DTS at early time points after fracking to assess fracture formation, as is currently done in the art, can be very misleading. FIG. 1 shows the large temperature variations that are seen when temperature is measured shortly after fracking. Using such early temperature data in modeling studies will provide erroneous predictions of fracturing spacing, density and geometry because the thermal radius of investigation is so small, it is not dependent on the fractures outside the casing.

Further, current DTS interpretation techniques and methods are based on visualization of the temperature change in the DTS data log, and is qualitative in nature, at best. The current interpretation methods are further complicated in applications where a reactive fluid, such as acid, is pumped into the wellbore, wherein the reactive fluid reacts with the formation rock and can affect a temperature of the formation, leading to erroneous interpretation.

Thus, what are needed in the art are better methods of obtaining and interpreting the DTS data to help engineers determine the fracture distribution in the well and make adjustments in the next stage of fracturing accordingly.

SUMMARY OF THE INVENTION

It is not possible to run a well just for DTS—typically there are time constraints on taking DTS measurements and one cannot measure the DTS constantly. For that reason, current industry practice is to setup for DTS and take all measurements at once, very shortly after frack fluid injection. The improvement described herein, by contrast, is to measure later during a shut-in period when temperature effects from crossflow and other such anomalies are reduced. This was previously not done because it was believed that the warmback period was fairly short. We have discovered, however, that the warmback period is actually very long lasting (weeks and even months), and although the signal is smaller, it is less noisy than the immediate post-injection data (1-36 hours). If needed due to small signal, actions that can improve signal size are increasing the difference in temperature (injecting colder water), or injecting for a longer period of time, which would extend the thermal radius of investigation out farther.

This disclosure also describes a method of identifying fracture spatial density with temperature profiles in the formation, where those temperature measurements are taken well after fracturing, during a shut-in period when temperature effects from crossflow and other such anomalies are reduced. This is hereby called a "shut-in temperature profile." The observed temperature changes are reduced in magnitude with time, but are still ascertainable and provide much more accurate information about the quality of the fracturing in a given stage. We have discovered herein that the size of the temperature drop relates more to fracture density, than to volume of fluid flow, as was believed in the prior art. This data can then be used in planning and optimizing the next stage of the fracture plan or in fracturing the next well.

Figure 2A:
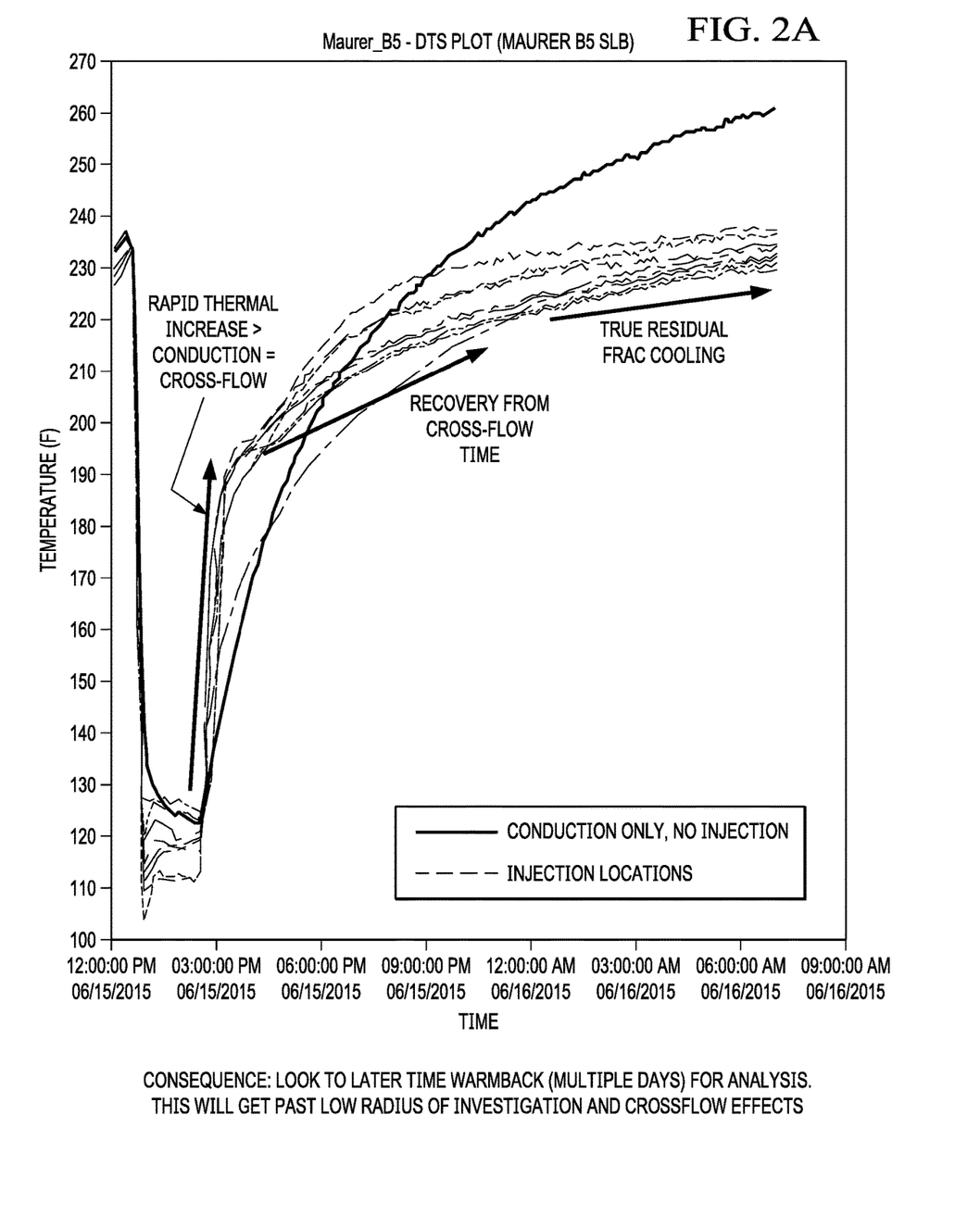
FIG. 2A shows real warmback temperature data over time in the Mauer B5 well in Texas, the different colors representing different lengths along the horizontal wellbore.

FIG. 2A illustrates the effect of measuring temperature early on versus later during shut-in. By waiting to measure for days or weeks to measure temperature, the changes in temperature are still observed. The signal may not be as big, but there is less noise. The effect is also much longer lasting than previously thought in the industry.

Figure 2B:
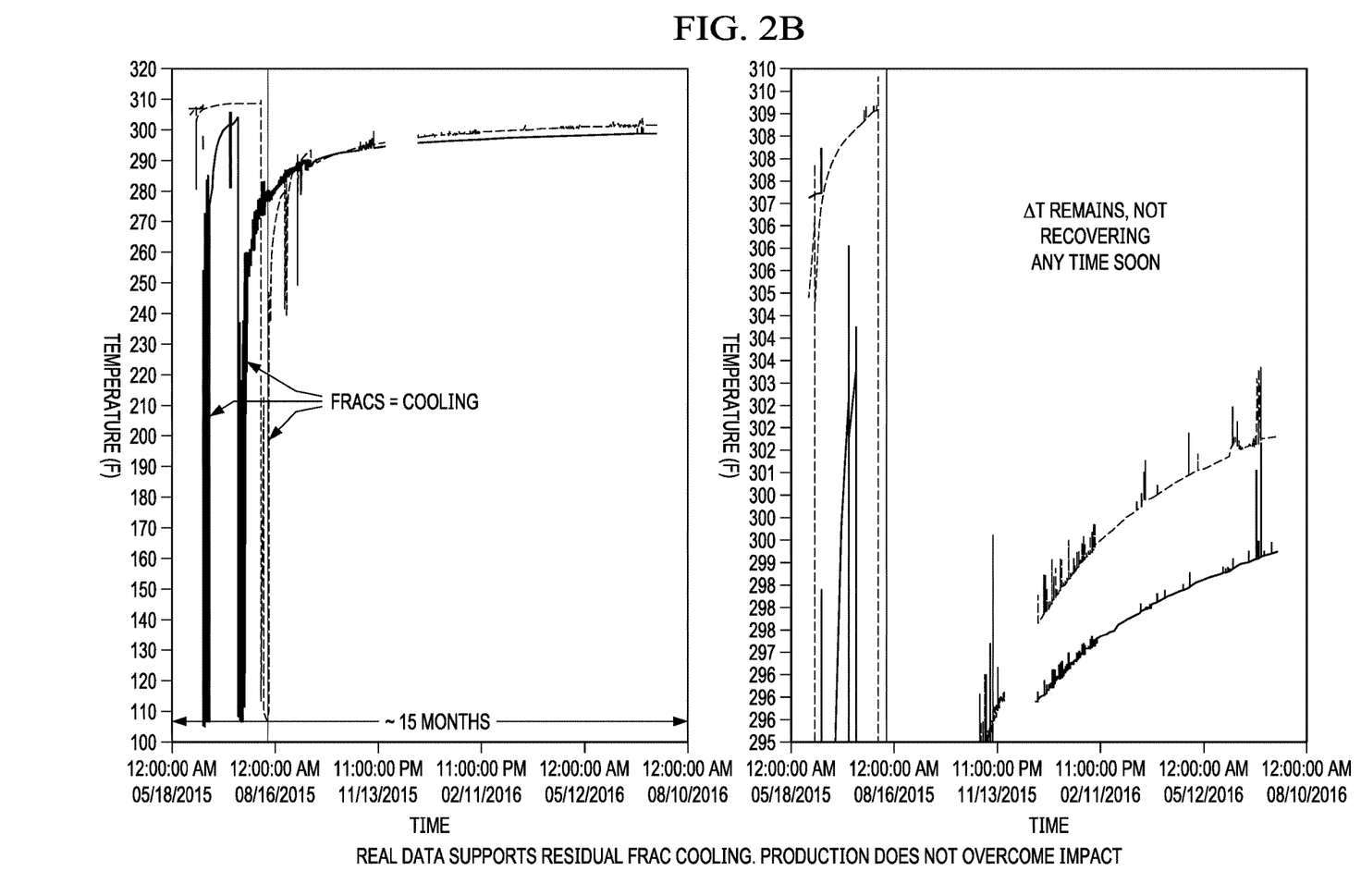
FIG. 2B shows real well temperature data over a longer period of time. The left hand panel shows the entire temperature range (100-320° F.), while the right hand panel shows a blow up of the upper temperature range only (295-310° F.), indicating that the warmback period lasts much longer than expected.

FIG. 2B shows real well temperature data over a longer period of time. The left hand panel shows the entire temperature range (100-320° F.), while the right hand panel shows an expanded view of the upper temperature range only (295-310° F.). As can be seen, the warmback period lasts much longer than expected, and thus it is possible to measure temperature using DTS much later than is currently done.

Figure 3:
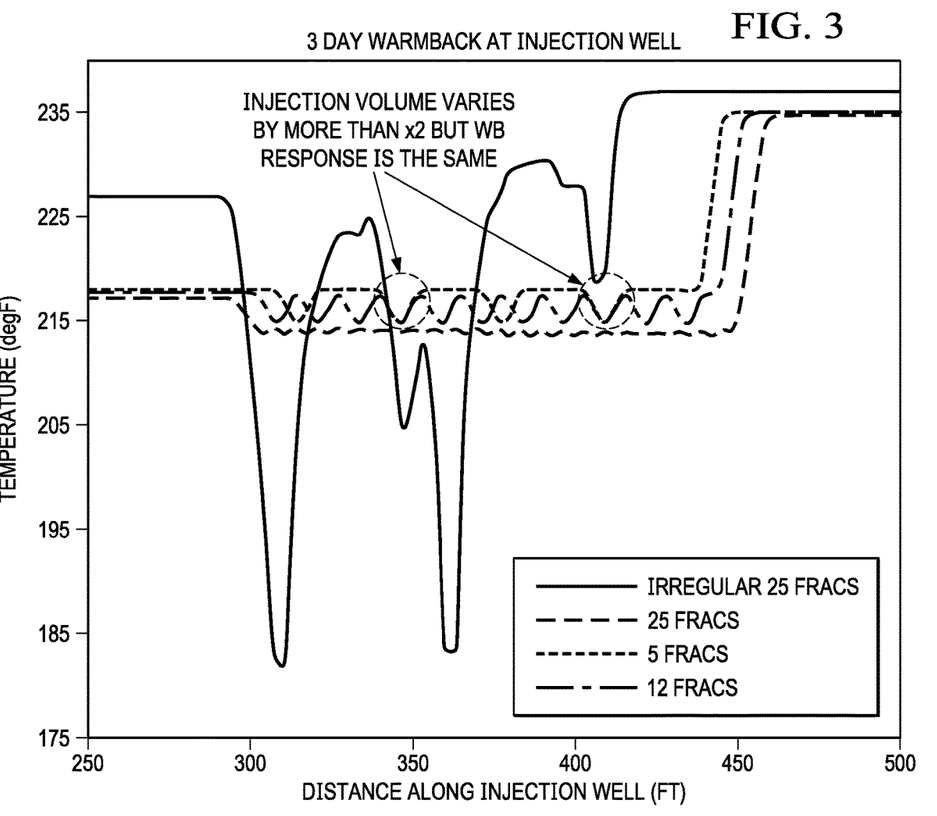
FIG. 3 shows modeling temperature traces 3 days after simulated fracturing with 5, 12, and 25 regularly spaced fractures, and 25 irregularly spaced fractures. The model predicts that fracture clusters will experience significantly higher degree of cooling, due to increased fluid flow. Thus, temperature drops indicate a fracture or cluster of fractures. The pre-frack well temperature is not shown, but it was about 235-240° F.
Figure 4:
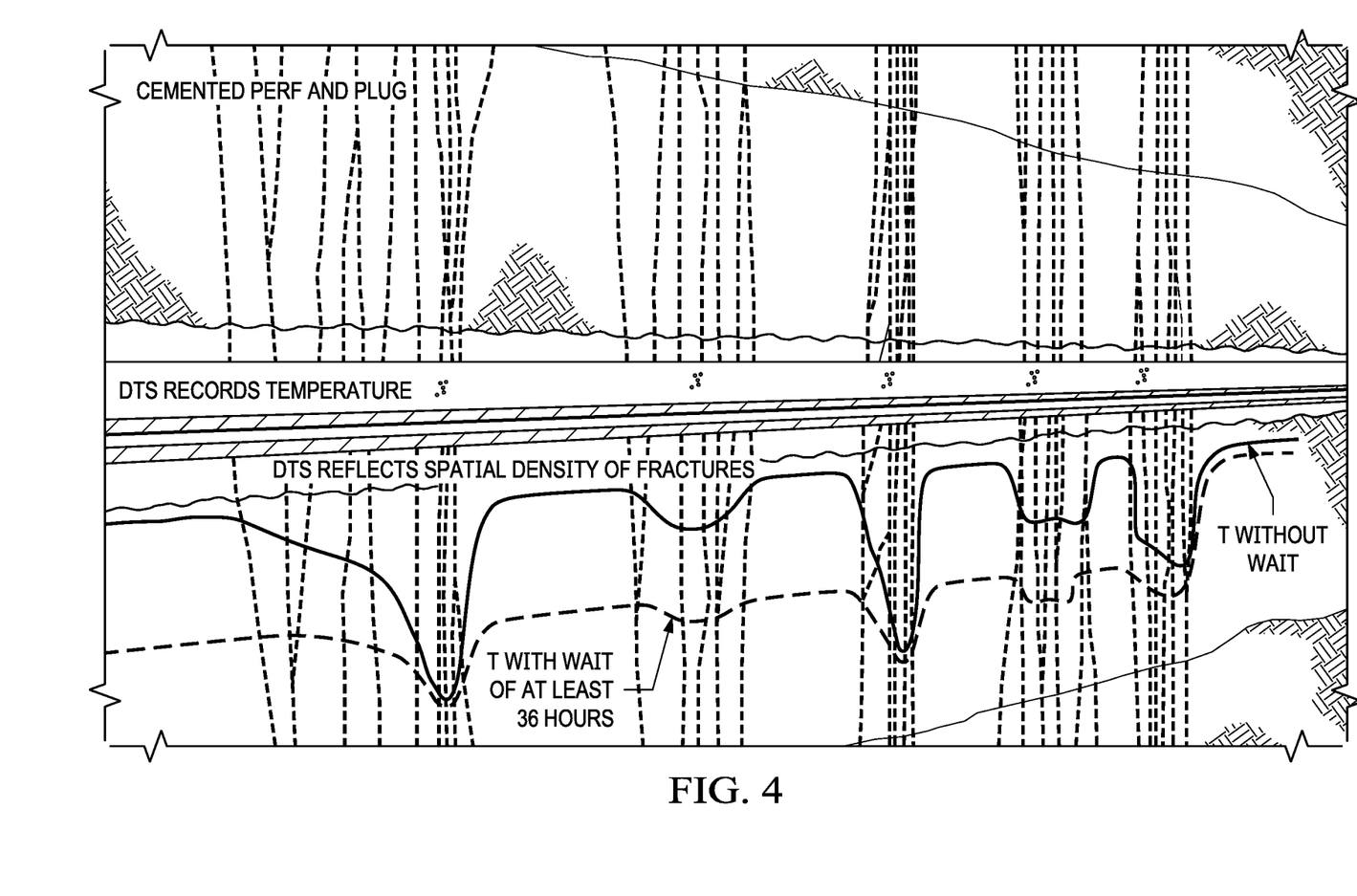
FIG. 4 shows a simulation of a reservoir, with fractures drawn in blue and DTS measurements in red, green and blue in the panel below, reflecting increasing time after injection. The size of the temperature drops decreases with time, until it can no longer be detected (blue).

FIG. 3 shows that fracture density can also be determined based on the size of the temperature peak, as is shown pictorially in FIG. 4. The more dense the fractures (e.g., the closer the spacing), the bigger the temperature change. Therefore, one can estimate fracture density from the size of the later measured temperature change.

The traditional view of the change in temperature is that ΔT equates to the volume of fluid injected at that point. However, we have demonstrated herein that the temperature magnitude is better correlated to spatial density of fractures than to the volume injected. This is confirmed in FIG. 5A-B, where the amount of slurry pumped into the well is known and we can see that temperature peaks for DTS do not correlate with volume. We can also see in FIG. 5A that the early DTS data was quite noisy, but when measured 1 week postfrack, areas of high fracture density are clearly visible by the retained temperature drop, even a week later.

Therefore, the postfrack shut-in temperature profile is measured by DTS, and by identifying the areas with lower temperatures one can identify the position of factures, and by determining the size of the temperature variation, one can identify fractures that are more closely spaced.

Identifying the location and spacing of fractures will facilitate any amendment to the completion plan to achieve more efficient drilling and production. The information can thus be inputted into any of the commercially available or proprietary fracture modelling programs, and the fracture plan optimized for the next section of wellbore to be fractured or even for adjacent wells.

A "shut-in" is when a well is closed and no flow to the surface is allowed. Thus, fluids are not flowing in either direction, although there can be localized fluid movement at the very beginning of the shut-in from high to low pressure zones. Shut-in is performed for all kinds of reasons, including to control the well, to perform certain maintenance work, and the like. Herein, we obtain DTS temperature profiles during a postfrack period of shut-in to minimize flow effects and other anomalies, thus reducing noise in the temperature profile.

As used herein, "warmback" refers to the gradual warming of the temperature near a wellbore after injection of a frack fluid that is cooler than the reservoir. The "warmback period" is the time needed for the temperature to return to pre-injection levels. We have discovered herein, that the "warmback period" lasts much longer than previously thought, and that later measurements of temperature—days, weeks and even months after fracturing—still provide valuable information about the reservoir, and with less noise. Thus, the method requires that warmback not be measured immediately after injection ceases, but after a certain wait period of at least 36 hours, or 1 week, 1 month or more. This is called "postfrack" herein.

A "fracture" is a crack in reservoir rock that allows fluid flow. The fracture may be an existing fracture in the formation, or may be initiated using a variety of techniques known in the art.

"Fracking" or "fracturing" as used herein, may refer to any human process used to initiate and propagate a fracture in a rock formation, but excludes natural processes that fracture formation, such as natural seismic events. "Hydraulic Fracking" means that pressure was applied via a fluid.

As used herein, "fracture parameters" refers to characteristics of fractures made using hydraulic fracking and includes fracture growth, fracture height, fracture geometry, isolation conditions between stages, stress shadows and relaxation, fracture spacing, perforation cluster spacing, number of perforation clusters/stage, well spacing, job size, pumping pressure, heel pressure, proppant concentration, fluid and proppant distribution between perforation clusters, pumping volume, pumping rate and the like. These parameters are typically entered into fracture modeling programs to predict outcomes and optimize fracture and completion plans.

As used herein, a "fracture model" refers to a software program that inputs well, rock and fracturing parameters and simulates fracturing results in a model reservoir. Several such packages are available in the art, including SCHLUMBERGERS® PETREL® E&P, FRACCADE® or MANGROVE® software, STIMPLAN™, tNAVIGATOR™, SEEMYFRAC™, TERRAFRAC™, ENERFRAC®, PROP®, FRACPRO™, GOHFER® (Barree & Associates LLC), and the like. For shale reservoirs, FRACMAN™ and MSHALE™ may be preferred. These models can be used with appropriate plugins or modifications if needed to practice the claimed methods.

By "fracture pattern", we refer to the order in which the frack zones are fractured.

The term "fracture complexity" refers to the degree of entanglement (or lack thereof) in the induced fractures. Fractures can range from simple planar fractures to complex planar fractures and network fracture behavior. Further, the fracture complexity can change from near-well, mid-field, and far-field regions.

As used herein, a "stage" of fracturing is a portion of well that is fractured at one time. Typically wells are fractured in stages, data obtained from a prior stage being used to optimized the next stage.

As used herein, "staged fracturing," also known as "multistage fracturing," is an operation in which numerous reservoir intervals are hydraulically stimulated in succession. Staged hydraulic fracturing operations are commonly performed from horizontal wellbores placed in shale gas reservoirs. Using geomechanical data, engineers are able to optimize the placement of perforations and fracturing stages to maximize gas or oil production. The interval is defined by sealing off the well, e.g., with a ball seal or other mechanical device.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| DTS | Distributed temperature sensing |
| DAS | Distributed acoustic sensing |

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

The temperature of injection fluid is typically lower than the temperature of each of the layers of the formation. Throughout the injection period, the colder fluid removes thermal energy from the wellbore and surrounding areas of the formation. Typically, the higher the inflow rate into the formation, the greater the injected fluid volume (i.e. its penetration depth into the formation), and the greater the cooled region. In the case of hydraulic fracturing, the injected fluid enters the created hydraulic fracture and cools the region adjacent to the fracture surface. When pumping stops, the heat conduction from the reservoir gradually warms the fluid in the wellbore ("warmback"). Where a portion of the formation does not receive inflow during injection, it will warm back faster due to a smaller cooled region, while the formation that received greater inflow warms back more slowly.

The inventors have now discovered that warmback lasts longer than previously believed, and that waiting for a period of time before obtaining a temperature trace improves the signal to noise ratio. Second, DTS warmback data is a measure of spatial efficiency and DAS during fracturing is a measure of volume distribution efficiency. For intervention data acquisition, it is beneficial to leverage the concept of residual frack cooling to get completion diagnostics without monitoring T during the actual frack so as to avoid constant processing of temperature during fracking, when in reality the warmback temperature profile more accurately corresponds to the spatial efficiency. Moreover, warmback temperature profile is more appropriate for completions tests that alter frack geometry, and not fluid distribution. The warmback temperature profile can also be combined with production logging methods when feasible.

For permanent data acquisition, temperature data can be viewed as the geometric/spatial tool to complement the DAS volumetric tool, not in competition with each other.

In plotting the temperature profile versus the distance along the injection well, we found that the temperature drops did not correspond to the volume of fluids injected. We proposed that the steep temperature drops actually corresponded to the existence of high density perforation clusters, whereas the more gradual slopes represented the lower density clusters.

The multiple fracture planes were then mapped. Inventors further performed different short shut-in periods/short warmback to validate the hypothesis, and the results also showed that there was uncertainty in interpreting the results, because the large temperature differences between the temperature in well and the temperature in the cement annulus remained, indicating that modeling assumption was incorrect.

Modifying modeling parameters, such as extending model time or extending the warmback period to more than 12 hours, still left the uncertainty of cross-flow issued between clusters. Further, extending model run time would be difficult when system resources were exhausted, and extending the warmback period would mean uncertain cross-flow effects.

Correlating temperature variation, especially the temperature drops (or cooling peaks), to the spatial density of fractures connected to the perforation cluster resulted in a much closer fit than to the volume of fluid placed at the cluster. The lower the temperature drops, the larger number and/or more closely spaced fractures exist near the wellbore. The spatial density of the fractures directly contributes to the temperature drop near the wellbore where fractures occur. However, the extent of temperature drop is not directly proportional to the spatial density, because the temperature drop tends to bounce back after a period of time and thereafter maintains constant at that level. The presence of such greater number of fractures and/or more closely spaced fractures means the fracture plans can be amended accordingly, for example reducing or terminating the fracturing operation may be optimal.

Using the above newly discovered principles, the general steps for the inventive method include:

1. Hydraulically fracture the oil or gas well.
2. Wait some period of time. While waiting, perform any number of operations on the well as long as it doesn't include injection of fluid that is comparable to the total heat transfer of hydraulic fracturing into the reservoir. Some operations may include but are not limited to plug or ball seat drill-outs, clean-outs, production, cased hole logging runs, etc.
3. Shut-in the well.
4. While well is shut-in and after the wait period of 2, record temperature across the hydraulically fractured section of the well using DTS. Thus, a "postfrack shut-in temperature profile" is generated.
5. Report the number and location of places in the well where the temperature is relatively lower than other sections of the well. These are locations of one or more hydraulic fracture(s) connected to the wellbore.
6. The magnitude of temperature at each of the locations identified in step 5 is a measure of the relative spatial density of fractures connected to the wellbore at that location. Thus, a lower temperature equates to a larger number and/or more closely spaced fractures.

The invention includes any one or more of the following embodiment(s) in any combination(s):

---

A method for assessing fractures in a formation having a wellbore, said method comprising:

a)     fracturing a first stage of a wellbore by injecting a fluid under pressure into said wellbore, wherein said fluid is cooler than said reservoir;

b)     waiting a predetermined period of time after said fracturing;

c)     shutting in said wellbore;

-continued d) measuring a warmback temperature along said first stage of said wellbore using a DTS sensor during said shut-in;
e) identifying a temperature drop in said measured warmback temperature at a position along said first stage of said wellbore; and
f) determining a fracture position at said position identified in step e.

A method for assessing fractures in a formation having a wellbore, said method comprising:
a) fracturing a first stage of a wellbore by injecting a fluid under pressure into said wellbore, wherein said fluid is cooler than said reservoir;
b) waiting a predetermined period of time after said fracturing;
c) shutting in said wellbore;
d) measuring a warmback temperature along said first stage of said wellbore using a DTS sensor during said shut-in;
e) identifying a temperature drop in said measured warmback temperature at a position along said first stage of said wellbore;
f) determining a fracture position at said position identified in step e;
g) determining a fracture density based on a magnitude of said temperature drop at said position identified in step e.

A method for fracturing a formation, said method comprising:
a) fracturing a length of a wellbore by injecting a frack fluid under pressure into said wellbore, wherein said frack fluid is cooler than said reservoir;
b) waiting a predetermined period of time after said fracturing step;
c) shutting in said wellbore;
d) measuring a warmback temperature along said length of said wellbore using a DTS sensor during said shut-in;
e) inputting said warmback temperature into a fracture modeling program;
   i) said program identifying one or more temperature drops along said along said length of said wellbore;
   ii) said program determining one or more fracture positions said along said length of said wellbore based on said one or more temperature drops;
   iii) said program determining one or more fracture densities based on a magnitude of said one or more temperature drops;
f) optimizing a fracture plan for a next stage or a next well based on said determined one or more fracture positions and said determined one or more fracture densities; and
g) fracturing said next stage or said next well according to said optimized fracture plan.

An improved method of determining fracture position, said method using DTS temperature data obtained along a length of wellbore shortly after fracture fluid injection, the improvement comprising waiting for a period of time, shutting in said well and collecting said DTS data during a shut-in period, said DTS data providing a temperature profile of said well, and correlating temperature drops in said temperature profile with fracture position.

An improved method of determining fracture position and density, said method using DTS temperature data obtained along a length of wellbore shortly after fracture fluid injection, the improvement comprising waiting for a period of time after fracture fluid injection, shutting in said well, and collecting said DTS data during a shut-in period, said DTS data providing a temperature profile of said well, and correlating temperature drops in said temperature profile with fracture position and correlating fracture density with a magnitude of said temperature drops.

An improved method of determining fracture position, said method using a DTS temperature profile measured shortly after fracture fluid injection, the improvement comprising waiting for least 36 hours after fracture fluid injection, shutting in said well and collecting a DTS temperature profile during said shut-in, and correlating temperature drops in said temperature profile with fracture position. Preferably, the wait is at least a week.

An improved method of determining fracture position and density, said method using a DTS temperature profile measured shortly after fracture fluid injection, the improvement comprising waiting for least 36 hours after fracture fluid injection, shutting in said well and collecting a DTS temperature profile during said shut-in, and correlating fracture position with temperature drops in said temperature profile and correlating fracture density with a magnitude of said temperature drops. Preferably, the wait is at least a week.

Any method herein described, further comprising measuring DAS data along said stage of said wellbore, inputting said DAS data into said fracture modeling program, and said program correlating a DAS data at a given position to a volume of flow at said position.

Any method herein described, further comprising determining a fracture density based on a magnitude of said temperature drop at said position identified in step e.

Any method herein described, further comprising measuring DAS data along said stage of said wellbore, and correlating a DAS data at a given position to a volume of flow at said given position.

Any method herein described, further comprising inputting said determined fracture position and said determined fracture density into a fracture modeling program and optimizing a plan to fracture a next stage based on said inputted fracture position and said inputted fracture density.

Any method herein described, further comprising fracturing said next stage according to said optimized fracture plan. Alternatively, a next well can be fractured according to said optimized plan.

Any method herein described, wherein said period of time before shut-in and temperature measurement is at least 36 hours, 1 week, 2 weeks, 3 weeks, 1 month, 3 months, 6 months, 9 months, a year or more.

Experimental Data

FIG. 1 is a simulation of temperature data during fracking and very shortly (3 days) thereafter. We can see that this early data shows large temperature variations, and can thus be misleading.

FIG. 2A shows real warm back temperature traces over time taken from the Mauer B5 well in Texas. FIG. 2A includes data when the well is flowing (early time points) and shut-in (later time points). These traces show that the early time measurements at various lengths along the wellbore, representing by the various colors, while showing bigger differentials, are misleading. Later measurements, by contrast, show smaller temperature changes, but noise from cross flow and other anomalies are removed. Each colored line is a different depth of an injection point. The black line is a different depth, which we know is not an injection point.

Based on these data we propose waiting for at least 3 days before taking DTS measurements, and preferably at least a week, a month, or more. Indeed, our data in FIG. 2B shows that the warmback period can still be detected as much as 15 months after fracturing.

FIG. 3 shows modeling temperature traces 3 days after simulated fracturing and during simulated shut-in with 5, 12, and 25 regularly spaced fractures, and 25 irregularly spaced fractures. As can be seen, the model predicts that dense fracture locations will experience significantly higher degree of cooling. The pre-frack well temperature is not shown but it is about 235-240° F.

FIG. 4 shows a representation of a reservoir. As can be seen, the size of the temperature variations decreases with time, till eventually lost, but temperature variations can be detected much longer than previously thought possible and with less noise.

Figure 5A:
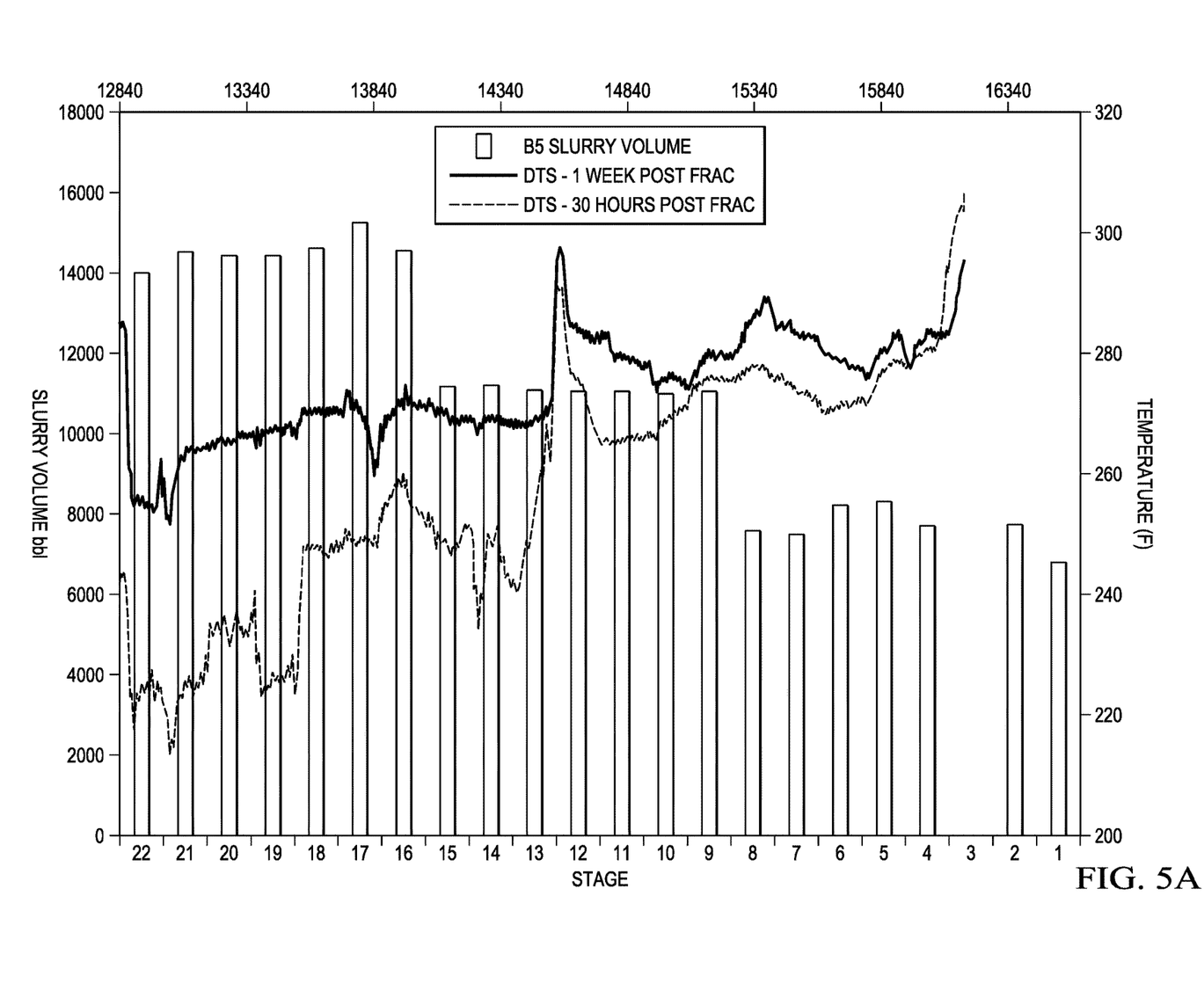
FIG. 5A is a plot of slurry volume (left y axis) pumped in each of the 22 stages (x axis) of fracturing along the Mauer B5 well in Texas. The DTS data is overlaid thereon (right y axis) at 30 hrs postfrack (green) and 1 week postfrack (red). Slurry volume measured with both distributed acoustic sensing ("DAS") and with perforation camera data and is presented as bars.

FIG. 5A is a plot of slurry volume (left y axis) pumped in each of the 22 stages (x axis) of fracturing along the Maurer B5 well in Texas. The DTS data is overlaid thereon (right y axis) at 30 hrs postfrack (green) and 1 week postfrack (red). The data is far less noisy at the later timepoint.

Figure 5B:
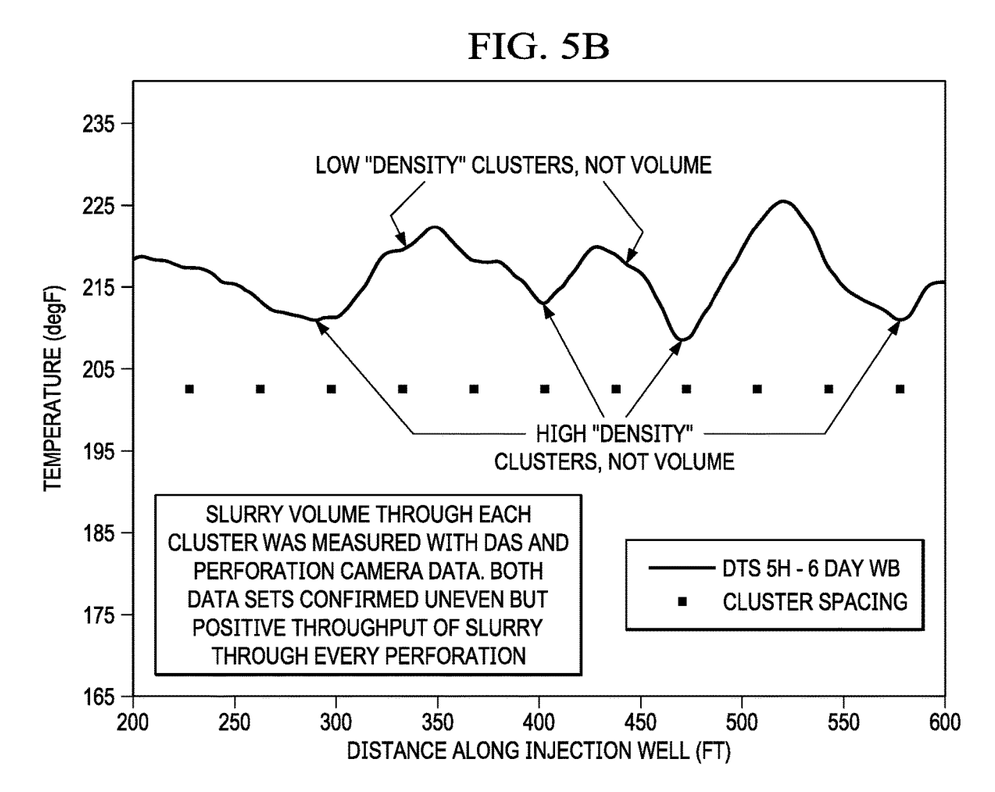
FIG. 5B shows another plot of temperature along the wellbore. In this real data case, the perforation clusters are shown (black boxes) and the temperature data show dips where there are high density cluster of fractures. That this is not a flow effect was confirmed by measuring slurry volume measured with both DAS and with perforation camera data.

FIG. 5B shows another plot of temperature along the wellbore. In this real data case, the perforation clusters are shown (black boxes) and the 6-day postfrack DTS temperature data shows dips where there are high density clusters of fractures. That this is not a flow effect was confirmed by actually measuring slurry volume with both DAS and with perforation camera data, as shown in FIG. 5A.

Typically, a fiber-optic cable, resembling a giant extension cord, is strapped to the outside of the well casing and run into the wellbore with the casing. Inside the cable, thin fiber-optic lines—each about the size of a human hair—relay distributed temperature and acoustic measurements along the length of the wellbore. Pressure and temperature gauges can also be spliced into the fiber-optic line to provide spot measurements. Engineers refer to this data-gathering setup as an instrumented well.

With no moving parts, this remote-sensing technology is well-suited for monitoring a variety of downhole activities in an unconventional well, including hydraulic fracturing, cementing, plug drill-outs, flowback and long-term production. Other applications include casing design, well integrity and artificial lift.

Figure 6:
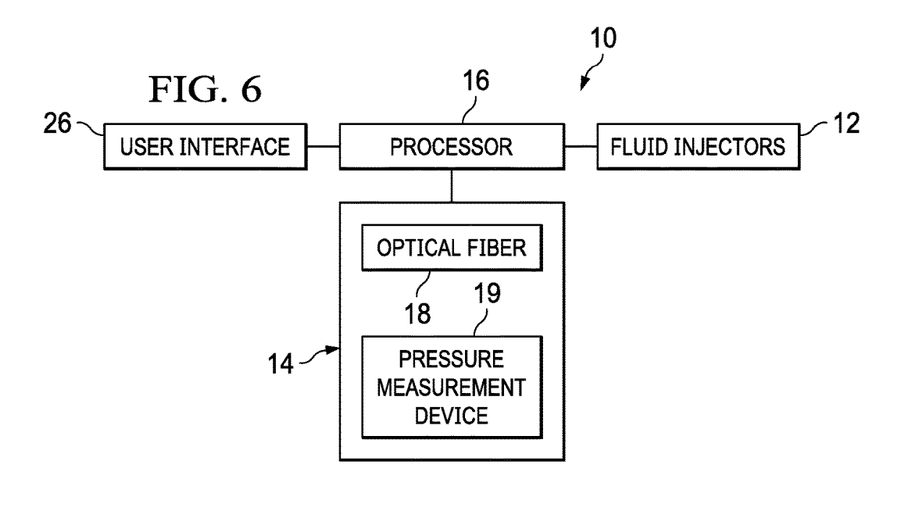
FIG. 6 is a schematic diagram of the invention.

Referring now to FIG. 6, there is shown an embodiment of a wellbore treatment system according to the invention, indicated generally at 10. As shown, the system 10 includes a fluid injector(s) 12, a sensor 14, and a processor 16. It is understood that the system 10 may include additional components.

The sensor 14 is typically of Distributed Temperature Sensing (DTS) technology including an optical fiber 18, disposed with the wellbore (e.g. via a permanent fiber optic line strapped to the exterior of the casing, or deployed using a coiled tubing, or a slickline unit). The optical fiber 18 measures the temperature distribution along a length thereof based on optical time-domain (e.g. optical time-domain reflectometry). In certain embodiments, the sensor 14 includes a pressure measurement device 19 for measuring a pressure distribution in the wellbore and surrounding formation. In certain embodiments, the sensor 14 is similar to the DTS technology disclosed in U.S. Pat. No. 7,055,604, hereby incorporated herein by reference in its entirety.

The processor 16 is in data communication with the sensor 14 to receive data signals (e.g. a feedback signal) therefrom and analyze the signals based upon a predetermined algorithm, mathematical process, or equation, for example. The processor 16 analyzes and evaluates a received data based upon an instruction set 20. The instruction set 20, which may be embodied within any computer readable medium, includes processor executable instructions for configuring the processor 16 to perform a variety of tasks and calculations.

As a non-limiting example, the instruction set 20 may include a comprehensive suite of equations governing a physical phenomenon of fluid flow in the formation, a fluid flow in the wellbore, a fluid/formation (e.g. rock) interaction in the case of a reactive stimulation fluid, a fluid flow in a fracture and its deformation in the case of hydraulic fracturing, and a heat transfer in the wellbore and in the formation. As a further non-limiting example, the instruction set 20 includes a comprehensive numerical model for carbonate acidizing such as described in Society of Petroleum Engineers (SPE) Paper 107854, titled "An Experimentally Validated Wormhole Model for Self-Diverting and Conventional Acids in Carbonate Rocks Under Radial Flow Conditions," and authored by P. Tardy, B. Lecerf and Y. Christanti, hereby incorporated herein by reference in its entirety. It is understood that any equations can be used to model a fluid flow and a heat transfer in the wellbore and adjacent formation, as appreciated by one skilled in the art of wellbore treatment. It is further understood that the processor 16 may execute a variety of functions such as controlling various settings of the sensor 14 and the fluid injector 12, for example.

Figure 7:
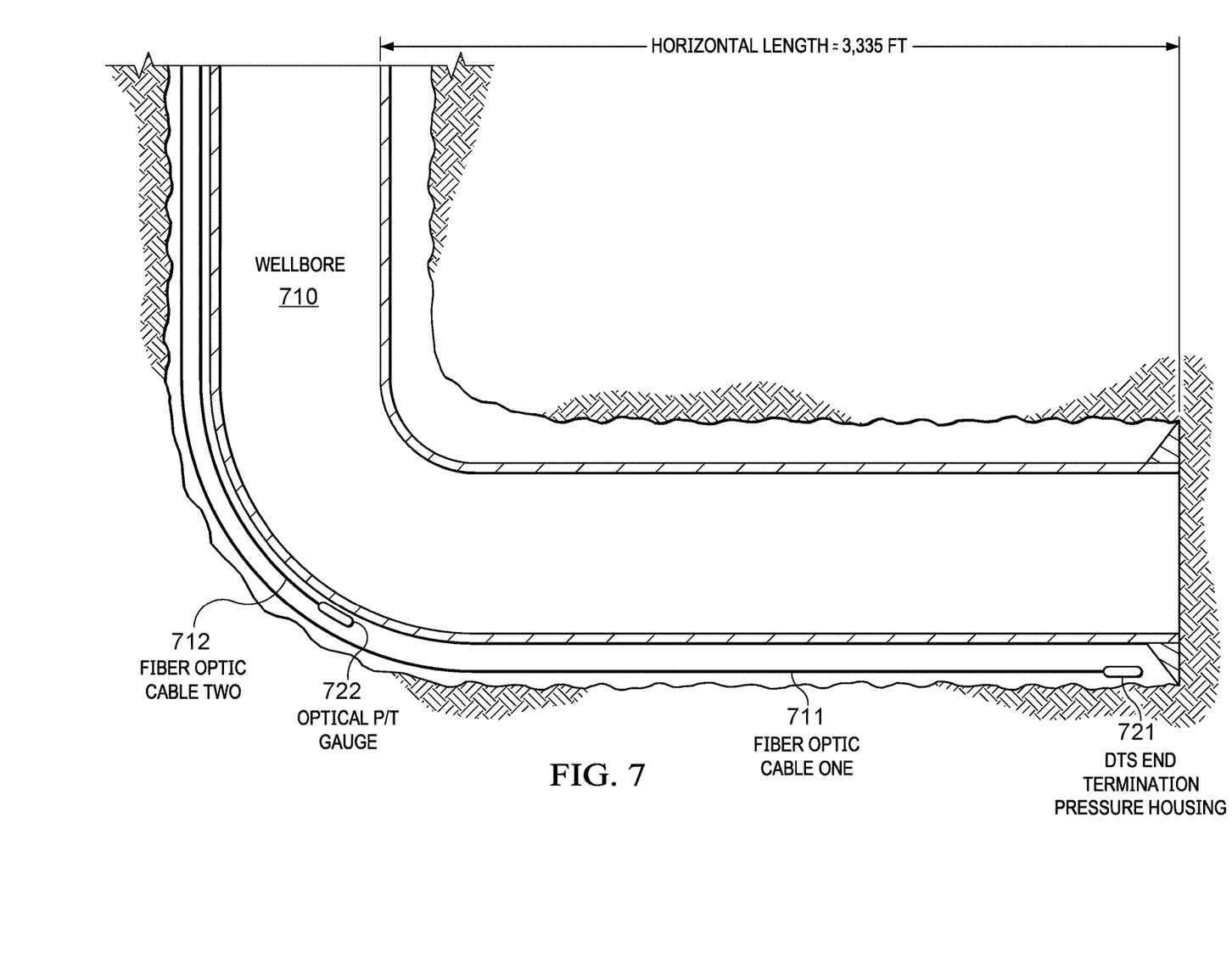
FIG. 7 is a schematic diagram of an exemplary system configuration of this disclosure. BUR=Buildup Rate; KOP=Kickoff point; TD=Total Depth; EOB=end of build.

FIG. 7 is a schematic diagram showing an exemplary configuration of the system used in this disclosure. In this configuration, two fiber optic cables 711, 712 are installed along the wellbore 710. Fiber optic cable 711 extends along the entire length of the wellbore 710 until the DTS end termination pressure housing 721. Fiber optic cable 712 extends only to part of the wellbore 710 and terminates at the optical P/T gauge 722. In this example fiber optic cable 711 has a length of approximately 16,525 feet, whereas fiber optic cable 712 has a length of approximately 13,138 feet, and the difference being the horizontal length of the wellbore 710 of approximately 3,335 feet. Only the toe portion of the well was prepped during certain fracturing stages, thus the pressure was communicated to the toe section, not the heel section.

The fracturing is then performed in multiple stages, with a shut-in period between each fracturing stages for warmback. With this configuration, fracturing stages were performed and the temperature signals measured by DTS were recorded after a wait during a postfrack shut-in and modeled. Certain fracturing characteristics, such as cluster efficiency, distributed volume, stage isolation, were then calculated.

Figure 8:
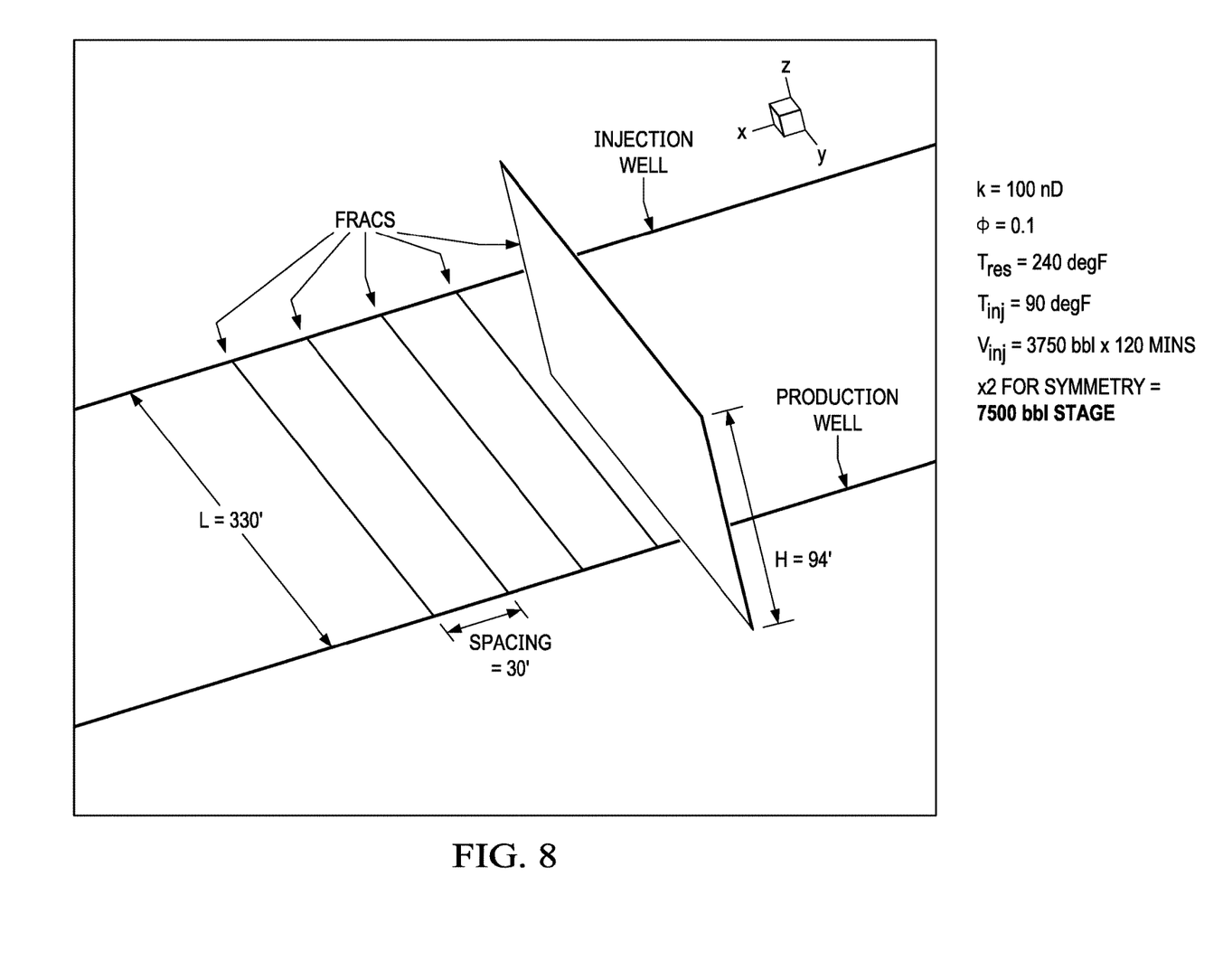
FIG. 8 is a schematic diagram of the simulated field used in the modeling studies described herein.

FIG. 8 shows the set up of the modeling, in which the injection of fracturing fluids was used to measure and detect fractures in the underground formation. In FIG. 8, the model assumes that the injection well is spaced from the production well at about 330 feet. The model assumes that the fractures exist between the injection well and the production well, and there is a 30-feet spacing between two adjacent fractures. The model also assumes that the injected fluid would fill the fracture that is about 94 feet in depth.

The temperature of the fracture prior to injection of fracturing fluid is $T_{res}$, in this case it is set as 240° F. The injected fluid has a temperature $T_{inj}$ of 90° F. The volume of injection $V_{inj}$ is 7500 barrels per fracture stage. Cross-well modeling results confirmed that the injected fracturing fluids travelled through 330 feet before pumping of fluids was completed. After a 3-day shut-in for warmback modeling, the in-well results indicated certain irregularities in temperature profiles. While the injection volume varied by more than two fold, the warmback response remained the same, indicating that previous premise that the lower temperature being the volume of injected fluid was incorrect.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The following citations are each incorporated by reference herein in its entirety for all purposes:
1. SPE-107854-MS (2007)—Tardy, et al., "An Experimentally Validated Wormhole Model for Self-Diverting and Conventional Acids in Carbonate Rocks Under Radial Flow Conditions"
2. SPE-116182-MS (2008)—Sierra J. R., et al., "DTS Monitoring of Hydraulic Fracturing: Experiences and Lessons Learned"
3. SPE-107775-PA (2009)—Glasbergen G., et al. "Real-Time Fluid Distribution Determination in Matrix Treatments Using DTS."
4. SPE-153131-PA (2013)—Holley, E. H., et al., "Interpreting Uncemented Multistage Hydraulic-Fracturing Completion Effectiveness By Use of Fiber-Optic DTS Injection Data." SPE Drilling & Completion, 28(3): 243-253.
5. SPE-168610-MS (2014)—Holley, E. H., et al. "Using Distributed Optical Sensing to Constrain Fracture Models and Confirm Reservoir Coverage in Permian Basin." SPE Hydraulic Fracturing Technology Conference, The Woodlands, Tex., U.S.A., 4-6 February.
6. U.S. Ser. Nos. 15/453,650, 15/453,216, 15/453,584, 15/453,434, 15/453,730, 15/453,044, all filed Mar. 8, 2017.
7. U.S. Ser. No. 62/519,450, entitled Simulated Rock Volume Analysis, filed Jun. 14, 2017.
8. URTEC-2670034-MS (2017) Raterman K. Y., et al., Sampling a Stimulated Rock Volume: An Eagle Ford Example.
9. U.S. Pat. No. 7,055,604, Use of Distributed Temperature Sensors During Wellbore Treatments
10. U.S. Pat. No. 9,464,512, US20130032338 Methods for fluid monitoring in a subterranean formation using one or more integrated computational elements
11. US20100076738, Computer-Implemented Systems and Methods for Use in Modeling a Geomechanical Reservoir System
12. US20110288843, Method for Interpretation of Distributed Temperature Sensors During Wellbore Treatment
13. US20170205260: Opto-Acoustic Flowmeter for Use in Subterranean Wells

The invention claimed is:

1. A method for assessing fractures in a formation having a wellbore, said method comprising:
   a) fracturing a first stage of a wellbore by injecting a fluid under pressure into said wellbore, wherein said fluid is cooler than said reservoir;
   b) waiting a predetermined period of time of at least 36 hours after said fracturing;
   c) shutting in said wellbore;
   d) measuring a warmback temperature along said first stage of said wellbore using a distributed thermal sensing ("DTS") sensor during said shut-in;
   e) identifying a temperature drop in said measured warmback temperature at a position along said first stage of said wellbore;
      i) determining a fracture position at said position identified in step e); or
      ii) determining a fracture density based on a magnitude of said temperature drop at said position identified in step e); or
      iii) determining both i) and ii); and
   f) measuring distributed acoustic sensing ("DAS") data along said first stage of said wellbore, and correlating DAS data at a given position along said first stage of said wellbore to a volume of flow at said given position along said stage of said wellbore.

2. The method of claim 1, further comprising inputting said determined fracture position and said determined fracture density into a fracture modeling program and optimizing a plan to fracture a next stage based on said inputted fracture position and said inputted fracture density.

3. The method of claim 2, further comprising fracturing said next stage according to said optimized fracture plan.

4. The method of claim 1, further comprising inputting said determined fracture position and said determined fracture density into a fracture modeling program and optimizing a plan to fracture a next stage based on said inputted fracture position and said inputted fracture density.

5. The method of claim 4, further comprising fracturing said next stage according to said optimized fracture plan.

6. The method of claim 1, wherein said period of time is at least 1 week.

7. The method of claim 1, wherein said period of time is at least 4 weeks.

8. The method of claim 1, wherein said period of time is at least 2 months.

9. A method for assessing fractures in a formation having a wellbore, said method comprising:

a) fracturing a first stage of a wellbore by injecting a fluid under pressure into said wellbore, wherein said fluid is cooler than said reservoir;
b) waiting a predetermined period of time after said fracturing of at least one week;
c) shutting in said wellbore;
d) measuring a warmback temperature along said first stage of said wellbore using a DTS sensor during said shut-in;
e) identifying a temperature drop in said measured warmback temperature at a position along said first stage of said wellbore;
f) determining a fracture position at said position identified in step e);
g) determining a fracture density based on a magnitude of said temperature drop at said position identified in step e).

10. The method of claim 9, further comprising measuring DAS data along said stage of said wellbore, and correlating a DAS data at a given position to a volume of flow at said given position.

11. The method of claim 9, further comprising inputting said determined fracture position and said determined fracture density into a fracture modeling program and optimizing a plan to fracture a next stage or next well based on said inputted fracture position and said inputted fracture density.

12. The method of claim 11, further comprising fracturing said next stage or said next well according to said optimized fracture plan.

13. The method of claim 9, wherein said period of time is at least 4 weeks.

14. The method of claim 9, wherein said period of time is at least 2 months.

15. The method of claim 9, wherein said period of time is at least 6 months.

16. A method for fracturing a formation, said method comprising:
a) fracturing a length of a wellbore by injecting a frack fluid under pressure into said wellbore, wherein said frack fluid is cooler than said reservoir;
b) waiting a predetermined period of time after said fracturing step of at least 36 hours;
c) shutting in said wellbore;
d) measuring a warmback temperature along said length of said wellbore using a DTS sensor during said shut-in;
e) inputting said warmback temperature into a fracture modeling program;
 i) said program identifying one or more temperature drops along said along said length of said wellbore;
 ii) said program determining one or more fracture positions said along said length of said wellbore based on said one or more temperature drops;
 iii) said program determining one or more fracture densities based on a magnitude of said one or more temperature drops;
f) optimizing a fracture plan for a next stage or a next well based on said determined one or more fracture positions and said determined one or more fracture densities;
g) fracturing said next stage or said next well according to said optimized fracture plan; and
h) measuring DAS data along said stage of said wellbore, inputting said DAS data into said fracture modeling program, and said program correlating a DAS data at a given position to a volume of flow at said position.

17. The method of claim 16, wherein said period of time is at least 1 week.

18. The method of claim 16, wherein said period of time is at least 4 weeks.

19. The method of claim 16, wherein said period of time is at least 2 months.

20. An improved method of determining fracture position and density, said method using DTS temperature data obtained along a length of wellbore shortly after fracture fluid injection, the improvement comprising waiting for a period of time of at least one week after fracture fluid injection, shutting in said well, and collecting said DTS temperature data during a postfrack shut-in period, said DTS temperature data providing a temperature profile of said well, and correlating fracture position with temperature drops in said temperature profile and correlating fracture density with a magnitude of said temperature drops.

* * * * *